Aug. 29, 1944.  E. W. MILLER  2,356,868
GEAR FINISHING TOOL
Filed Feb. 19, 1940  4 Sheets-Sheet 3

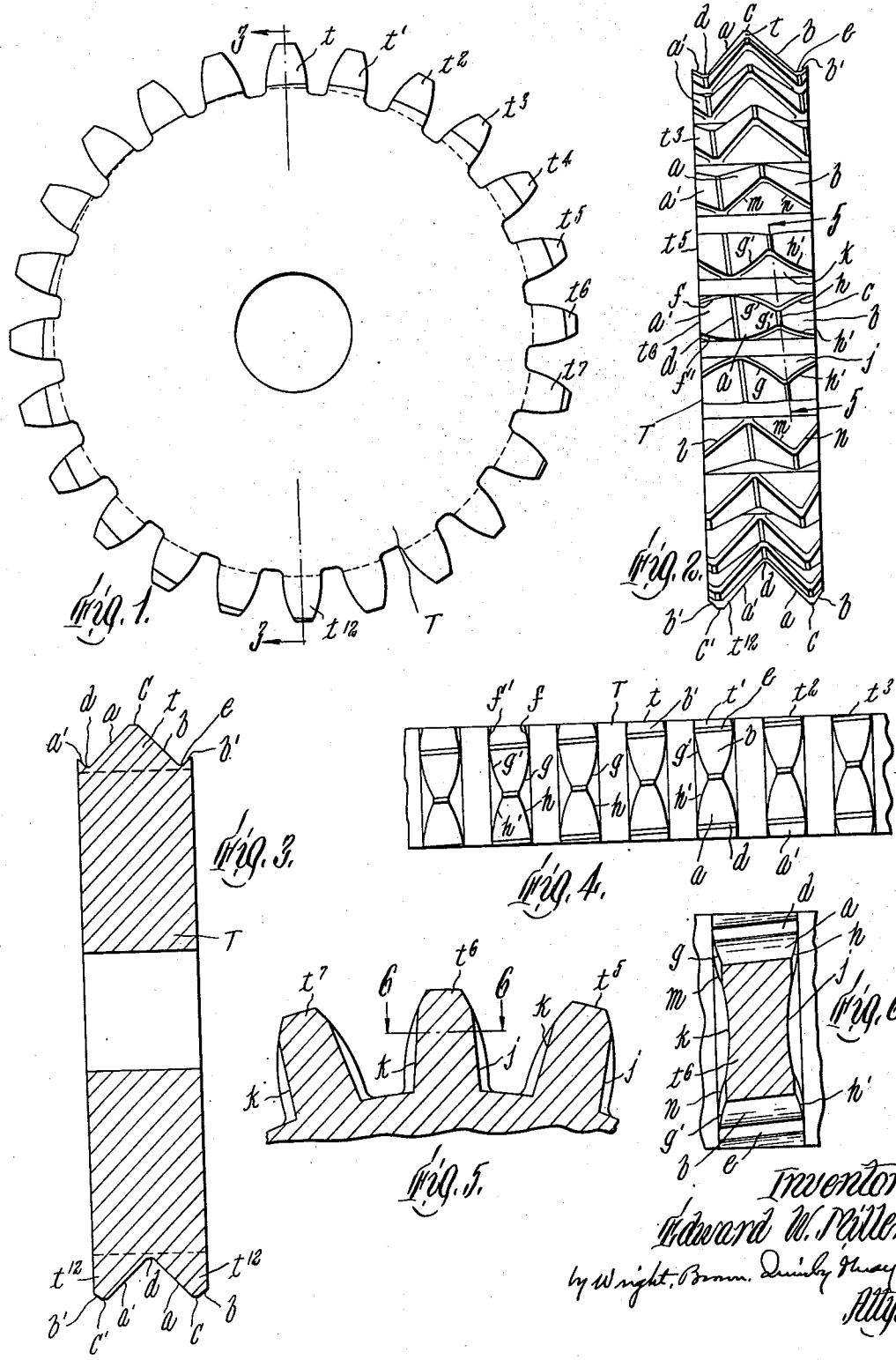

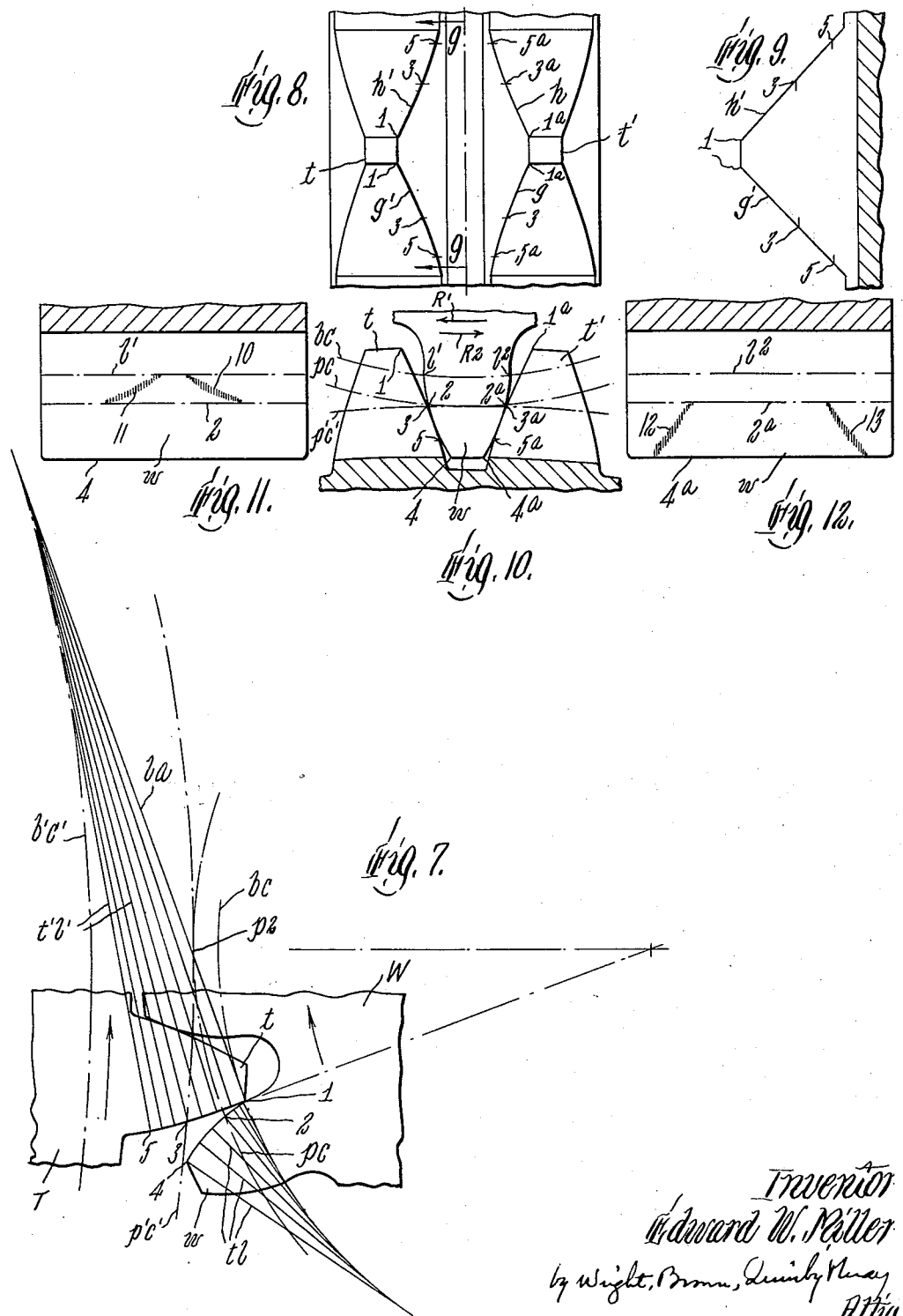

Inventor
Edward W. Miller
by Wright, Brown, Quinby they
Attys.

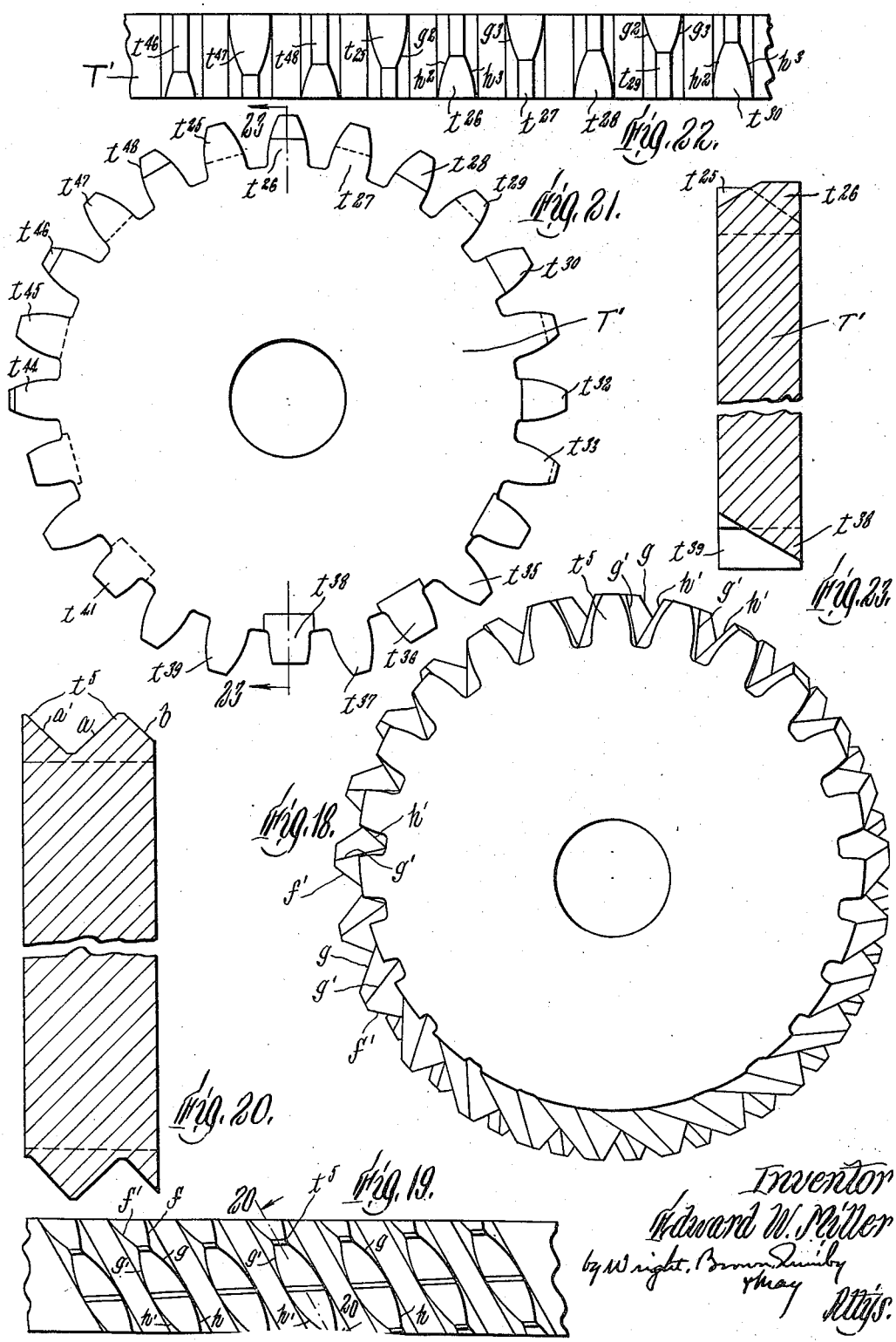

Patented Aug. 29, 1944

2,356,868

UNITED STATES PATENT OFFICE 2,356,868

GEAR FINISHING TOOL

Edward W. Miller, Springfield, Vt., assignor to The Fellows Gear Shaper Company, Springfield, Vt., a corporation of Vermont Application February 19, 1940, Serial No. 319,599

5 Claims. (Cl. 29—103)

The present invention relates to tools adapted to finish gears by a shaving or scraping action while rotating in mesh with the gear to be finished and while either driving or being driven by such gear. The object of the invention is to furnish a tool for this purpose which is simpler and less expensive to manufacture than those heretofore used in commercial practice, which can be more easily and simply restored to good cutting condition when its edges have become dull, which is tougher and more rugged to withstand excessive or sudden stresses and shocks, and by which a more rapid cutting may be effected and the teeth of the work piece brought to final prescribed dimensions with no loss of control or impairment of accuracy in consequence of the more rapid cutting action.

The principles of the invention and the particulars which I claim and desire to protect hereby are explained in the following specification, with reference to the drawings, in which some of the possible commercial embodiments of the invention are shown and described.

In the drawings—

Fig. 1 is an end elevation of one embodiment of my novel finishing tool adapted for use in finishing spur gears;

Fig. 2 is a side view of the tool as seen from the right hand side of Fig. 1;

Fig. 3 is a diametral section taken on line 3—3 of Fig. 1;

Fig. 4 is a partial development view in which the teeth at the upper side of the tool shown in Fig. 1 are represented as laid out with the pitch circle in a plane;

Fig. 5 is a sectional view of three of the teeth of the tool taken on line 5—5 of Fig. 2 and enlarged in scale;

Fig. 6 is a cross section of one of the teeth taken on line 6—6 of Fig. 5 and shown on a still larger scale;

Figure 17:
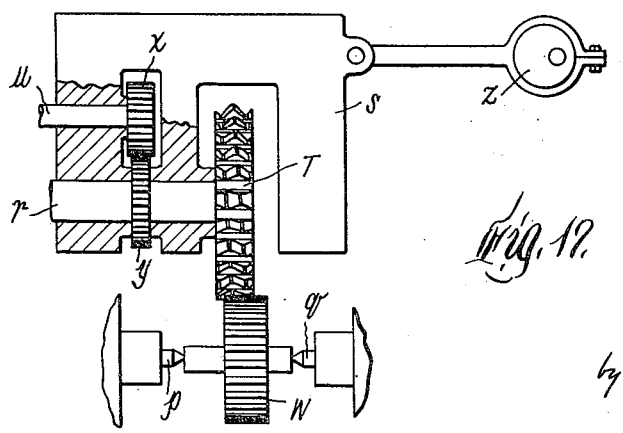

Figs. 7-16 inclusive are diagrams illustrating the action of the teeth of the cutting tool as they roll into mesh with the teeth of the work;

Fig. 17 is a diagram illustrating the relationship of the tool to the work in a machine wherein both are mounted for performance of the cutting operation;

Figs. 18, 19 and 20 are views similar to Figs. 1, 3 and 4, respectively, showing a similar tool adapted for finishing helical gears;

Figs. 21, 22 and 23 are, respectively, an end view, a partial development, and a sectional view on line 23—23 of Fig. 21, of a modified form of the invention, embodying in part the same principles, and adapted to be used for finishing spur gears.

Like reference characters designate the same parts wherever they occur in all the figures.

The tool T represented in Figs. 1-17, inclusive, is similar to a spur gear in that it has teeth $t$ of which the profiles or projections in planes perpendicular to the axis have the outlines of conventional gear teeth. In tools provided for finishing involute gears, the faces of such teeth in profile and projection are involute curves. This tool may be made of tool steel or other metal alloy or composition suitable for metal cutting tools.

The teeth of this tool are beveled from points in their crests or tops on diverging slopes toward the root circumference, to a depth at least as great as the innermost points at which mating gear teeth make contact with the faces of the tool teeth, so as to form oppositely sloping cutting edges in their opposite sides. Such bevels and cutting edges moreover are offset endwise progressively from tooth to tooth, conveniently in such fashion that the teeth, when the tool is viewed edgewise, appear in parts of the tool circumference as segments of a helical V-shaped rib, and in other parts as the flanks of a helical V-shaped groove or valley; and such parts overlap one another. Thus the tooth $t$ at the upper side of the tool as shown in Fig. 1 has the opposite bevels $a$ and $b$ extending from a narrow top land $c$ in the outer circumference of the tool, to narrow bottom lands $d$ and $e$ in or near the tooth root circumference, while between said bottom lands and the end faces of the tool are short upward slopes $a'$ and $b'$ respectively.

The tooth $t^{12}$ at the diametrically opposite side of the tool from the tooth $t$ is intersected by a V groove having bounding slopes $a'$ and $a$ which are helical projections around the tool axis of the correspondingly designated slopes of tooth $t$. The crest or top of tooth $t^{12}$ contains two narrow lands $c$ and $c'$, between which and the end faces of the tool are the slopes or bevels $b$ and $b'$ directed toward the axis. In the tooth $t^6$ midway between those previously described, there is a single top land $C$, a single bottom land $d$, and three sloping beveled faces $a'$, $a$ and $b$. The beveled faces referred to may be considered as portions of conical helicoids which are interrupted by the spaces between the successive teeth. They are most conveniently made by cutting a helical V-groove in the circumference of the tool after its teeth have been initially generated; but alternately, such a groove may be cut in the circumference of a tool blank before generating the teeth. The intersections of the beveled faces with the side faces of the teeth form cutting edges which, in the tooth $t^6$, are designated $f$, $f'$, $g$, $g'$ and $h$, $h'$. Other teeth have substantially similar or corresponding cutting edges.

It is to be noted that on each tooth there are cutting edges which extend slantwise all the way from a top land to a bottom land; that in most of the teeth there are two such cutting edges in each side; and in other teeth (such as the tooth $t^6$), the slopes (as $a'$ and $b$) which do not extend continuously from bottom land to top land or from top land to bottom land, collectively cover the whole distance. In this particular illustration the helical groove makes slightly more than one complete turn around the circumference of the tool. But in tools of greater length, or in others where the helical lead is less, there may be two or more complete convolutions of the helix.

Clearances are formed in the faces of the teeth by cutting away the tooth substance in areas of which the boundaries are relatively near and substantially parallel to the cutting edges. The clearances are shown with enlargement and exaggeration at $j$ and $k$ in Figs. 5 and 6. The approximate locations of their boundaries are indicated in Fig. 2 by the lines $l$, $m$ and $n$. Such clearances are located so as to leave tooth face zones with the original accurate generated contours adjacent to the cutting edges, to bear on the teeth of the work piece with unit pressures reduced to a balance such as to allow a good cutting action while preventing the cutting edges from biting too deeply.

The tool here described is put to use by mounting it on a spindle or arbor with its axis parallel to the axis of the gear to be finished and its teeth in mesh with the teeth of the gear. Either the tool or the gear is rotated by power, and the teeth of the member so rotated impart rotation to the other member. Fig. 17 illustrates how this may be done. A work gear W may be mounted on an arbor supported to rotate on fixed centers $p$ and $q$, and the tool T may be carried by a shaft $r$ rotatable on a carriage $s$ and driven positively by a shaft $u$ and gearing $x$, $y$. The carriage $s$ is mounted to move parallel with the axes of the tool and work piece and may be given a reciprocating motion in its path of movement at any desired speed by an eccentric $z$ or other suitable mechanism.

The cutting action is performed by a combination of radial slip as the teeth of the tool come into mesh with the work gear teeth, and axial traverse due to the reciprocating motion of the tool. The character of the radial slip is shown by the slippage diagram in Fig. 7. It is assumed here that $t$ represents a tooth of the tool and $w$ a tooth of the work gear, and that the tool and gear are rotating in the direction of arrows applied to them. These teeth are represented as just coming into action at the point 1, where the line of action $la$ is tangent to the base circle $bc$ of the work gear. The lines $tl$ are tangents to the base circle $bc$ at points equidistant from one another along an arc equal to that through which the tooth $w$ travels while in contact with the tooth $t$; and the lines $t'l'$ are tangents to the base circle $b'c'$ of the tool at points of which the distances from one another are equal to the travel of the base circle $b'c'$ while the base circle $bc$ travels through the distances between the successive tangent points of the lines $tl$. The lengths of arcs on tooth $t$ and tooth $w$ between corresponding tangent lines measure the radial slip as the teeth pass into full mesh and then out of mesh. The arc on the tooth $w$ between the point 1 and the point 2 (where the pitch circle $pc$ of the work gear intersects the side of the tooth), slides along the arc of the tooth $t$ from the point 1 to the point of intersection 3 between the side of tooth $t$ and the pitch circle $p'c'$ of the tool. The points 2 and 3 coincide when they reach the pitch point $p^2$. After passing the pitch point, the arc from point 2 to the extremity 4 of the gear tooth $w$ slides on the arc 3—5 of the tool tooth $t$; this slippage being in the opposite direction to that between arcs 1—2 and 1—3 referred to above. A similar but opposite action takes place between the opposite side of the tooth $t$ and the contiguous tooth of the work gear.

Figure 14:
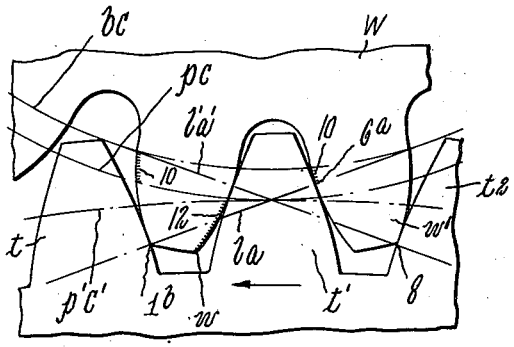
Figure 13:
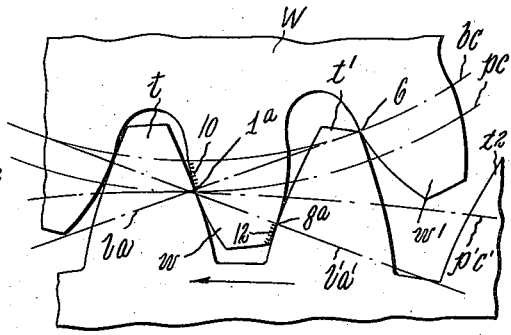
Figure 16:
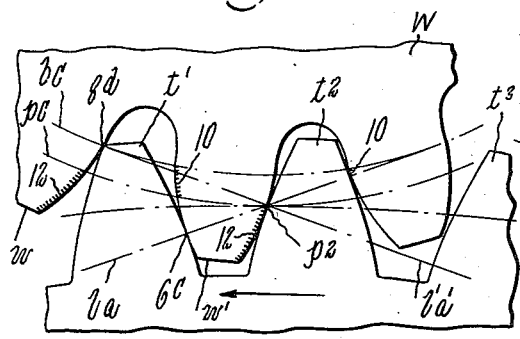
Figure 15:
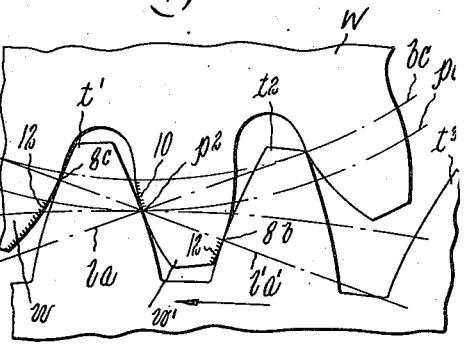

These actions are further explained by Figs. 13–16, inclusive, which show mating teeth of the tool and gear in four different positions. The teeth of the tool here shown are assumed to be those corresponding to $t$, $t'$, $t^2$ and $t^3$ of Fig. 1. The base and pitch circles of the gear are again represented as $bc$ and $pc$ respectively, the pitch circle of the tool is represented as $p'c'$ and the lines of action are designated $la$ and $l'a'$. In Fig. 13 the trailing side of tool tooth $t'$ is at the beginning of contact with the gear tooth $w'$ at the point 6, and the corresponding contact between the tool and work teeth $t$ and $w$ (designated in Fig. 7 by the reference character 1), has shifted to the point $la$. In Fig. 14 the contact between teeth $t$ and $w$ has shifted to $lb$, and these teeth are about to separate. The contact between $t'$ and $w'$ meanwhile has shifted to $6a$. In Fig. 15 this latter contact point is indicated as having shifted to the pitch point $p^2$; and in Fig. 16 it is at the location $6c$.

Considering the contact on the other side of the teeth (the advancing side of the tool teeth and trailing side of the work gear teeth), the point of contact travels along the line of action $l'a'$. It begins at a point corresponding to the point 8 in Fig. 14, travels through the position $8b$ of Fig. 15, on through the pitch point ($p^2$, Fig. 16), and terminates at a point corresponding to $8d$, Fig. 16. When the slip of the work gear tooth is toward the root circumference of the tool, cutting occurs; but when it is away from that circumference, the edges $f$, $g$, $h$, etc. of the tool teeth do not cut because they are then withdrawing. Thus the advancing side of the tooth $w'$ (and the corresponding side of every other tooth) receives a cutting action while the point 6 travels toward the pitch point; and the following or trailing side of the tooth $w'$ receives a cutting action while the point of contact travels from the position 8 (Fig. 14) to the pitch point. The shaded arc 10 of the advancing face within the pitch line of the work gear and the shaded arc 12 of the trailing face outside of that pitch line are then cut. Rotation in the direction opposite to that indicated by the arrows in Figs. 7 and 13–16 causes a cutting action on the arcs of the work gear teeth which were not cut during the rotation in the first direction.

Reference is now made to Figs. 8–12, which show two teeth of the tool flanking one tooth of the work gear. The tool teeth thus represented may be considered as the teeth $t$ and $t'$ of Figs. 1, 2 and 13–16, and the work gear tooth as the tooth $w$ of Figs. 13–16. When the rotation is in the direction of the arrow R' in Fig. 10 the segments of the cutting edges $g'$ and $h'$ between the points 1 and 3 act upon areas of the left hand side of the work gear tooth between the lines $l'$ and 2, such areas being approximately indicated by the shaded areas 10 and 11 on Fig. 11. And the segments of the edges $g$ and $h$ of tooth $t'$ between the points $3a$ and $5a$ act upon the right hand side of the gear tooth between the extremity $4a$ and the line $2a$ in approximately the locations designated by the shaded areas 12 and 13 in Fig. 12. The projections of these four areas are indicated in Figs. 13–16 by shading at 10 and 12.

Owing to the offsetting of the cutting edges of successive tool teeth, corresponding areas acted on by successive teeth are at one side or the other of the areas last described. The tools are designed to have a hunting tooth action (i. e., with a number of teeth which is not an exact multiple of the number of teeth of the work gears), so that in the course of a sufficient number of rotations each tooth of the tool comes into engagement with each tooth of the work, and the areas acted on by the several cutting edges collectively include all of the area between the lines $l'$ and 2 on one side of the work gear teeth, and the area between the edge $4a$ and line $2a$ on the other side of these teeth, within the limits of length of the tool teeth. In addition the axial reciprocation of the tool distributes the cutting effect endwise with the result that the work gear teeth are thus acted on throughout their entire length even if longer than the teeth of the tool.

No slip occurs between tool and gear at the pitch line, and the axial reciprocation is relied on to effect the necessary cutting action in that region of the work gear.

After cutting in the regions above described has continued to the desired extent, the direction of rotation is reversed. When rotating in the direction of the arrow $R^2$ shown in Fig. 10, the segments between the points 3 and 5 of the cutting edges $g'$ and $h'$ act upon the left hand side of the gear tooth between the edge 4 and line 2 in the same manner as represented in Fig. 12; and the segments between points $1a$ and $3a$ of the cutting edges $g$ and $h$ of tool $t'$ act on the right hand side of the tool tooth in the area between the lines $l2$ and $2a$ in the same way as represented in Fig. 11. The direction of rotation is reversed several times in the course of cutting the work gear to finished dimensions in order to distribute the cutting effect uniformly. Such reversals may be made whenever the tool has completed a number of rotations equal to the number of its teeth or, in other words, when all of the tool teeth have acted at least once upon all of the work gear teeth in uni-directional rotation.

The same action and effect in finishing helical gears is accomplished by tools having helical teeth of equal helix angle and opposite hand to the gear to be finished. Such a tool is shown in Figs. 18–20, the nature, characteristics and functions of which will be apparent without further explanation in view of the preceding description. It differs from the spur type tool only in that its teeth are helical. The section of Fig. 20 is taken on two different planes: that of the upper part of the figure being the median longitudinal helicoid of the uppermost tooth (indicated by the line 20—20 of Fig 19), and that of the lower part of the figure being the corresponding helicoid of the lowermost tooth. The cutting edges lie in the intersections of conical helicoids with the sides of the teeth, and are designated by the same reference characters used in the description of the spur type tool.

Other ways of beveling the tool teeth so as to form the inclined cutting edges are within the scope of the invention. One such alternative formation is shown in Figs. 21, 22 and 23, wherein alternate teeth are oppositely beveled toward one end only. The tool here shown is designated $T'$ and its teeth are designated by the reference letter $t$ modified by exponents from 25—48. Having reference to the position in which the tool is shown in Figs. 21 and 22, the tooth $t^{25}$ is beveled on an inclined plane from the crest toward the rear or remote end, and the next adjacent teeth at opposites sides thereof ($t^{26}$ and $t^{48}$) are beveled from the crest toward the nearer end. As to the balance of the teeth, those designated by reference characters with odd numbered exponents are beveled in the same direction as the tooth $t^{25}$, and those of which the reference characters have even numbered exponents are beveled in the direction of the teeth $t^{26}$ and $t^{48}$. But the bevels of adjacent teeth are offset with respect to one another. Beginning with the tooth $t^{44}$ and continuing in clockwise rotation around the circumference of the tool, those teeth which are beveled on the forward end are progressively more and more cut away. In other words, the length of their top lands from the rear end of the tool is progressively shorter. But as to the teeth which are beveled toward the rear end, the top lands of successive teeth viewed clockwise around the tool are progressively shorter. The opposite bevels of adjacent teeth overlap, as is made apparent by the development view, Fig. 22. The angle of bevel is preferably the same as to all the teeth and is steep enough to cause the inclined cutting edges of some teeth as, for example, $t^{32}$ and $t^{45}$, to extend all the way from the crest circumference to the root circumference, and of many others to extend inward at least as far as the innermost points of engagement with mating teeth. The intersections of the beveled faces with the front end face of the tool are shown by full lines, and those with the rear end face by dotted lines, in Fig. 21. Although in this illustration some of the teeth, as $t^{36}$, $t^{38}$ and $t^{41}$, are cut away by reason of the beveled formation to less than full height in all of their length, they are separated from one another by intermediate teeth of full height, and in no case is the beveled tooth low enough to lose continuity of mesh with the work gear.

It is to be understood that all embodiments of the invention here described are provided with the clearance recesses corresponding to those shown at $j$ and $k$ in Figs. 5 and 6, although for simplicity they are not represented in any of the other figures except Fig. 2.

It is to be understood of course that all of the tools in which this invention is embodied are analogous to gears in that their teeth are conjugate to the teeth of the specific gears which they are provided to finish and that they impart rotation to, or are rotated by, such gears through gear action. In the case of tools for finishing involute gears, which is the almost universal case and is the one shown here, the tooth forms of the tool are determined and designed in accordance with the laws of involute gears.

The tools of this invention are rugged inasmuch as the teeth are long at the base, where they join the body of the tool. Their beveled and end faces converge from the root toward the crest, whereby they have much greater strength to resist fracture than finishing tool teeth of which the cutting edges are formed by intersecting parallel grooves. Such tools are relatively simple and inexpensive to construct initially, as compared with those which are slotted in the sides of the teeth or entirely through the teeth. And it is easy to recondition them after their edges have become dull, since they may be sharpened by simply grinding a small amount of stock from the beveled faces. In the case of the tools represented in Figs. 1 and 18, and related figures, such sharpening may be effected by rotating the tool in contact with a grinding wheel having a V-shaped circumference and giving either the tool or the grinding wheel an axial feed corresponding to the lead of the helicoids on which the beveled faces are located.

The cutting action of the edges is certain by virtue of the clearances in the sides of the teeth between them; and rapid because they cut while rolling into mesh as well as by virtue of the axial reciprocation. But the unrelieved surfaces immediately adjacent to the cutting edges limit the depth of cut and thereby control the cutting action to closer limits of accuracy than is possible by means of teeth having but few cutting edges, and those edges relieved, in the absence of means in the nature of external gearing for correlating relative speeds of cutter and work. The fact that the teeth are of full height (with the negligible exception of a few of the teeth in the tool of Figs. 21-23, and even those few teeth extend beyond the pitch line), and that all are of full width on the pitch line, insures continuity of action and absence of backlash as to any of the teeth of the tool, thus insuring uniformity and accuracy of the cutting action. Sufficient width of unrelieved surface is left adjacent to a sufficient number of the cutting edges to insure such control and continuity of action after repeated sharpenings and until the tool has reached the end of its useful life by reason of stock removed by sharpening.

What I claim and desire to secure by Letters Patent is:

1. A gear finishing tool of cylindrical gear character composed of material suitable for metal cutting tools having gear-like teeth arranged on a pitch line surrounding the axis of the tool conjugate to the gears to be finished, and of which the teeth are truncated transversely on planes inclined to their height and length dimensions and have cutting edges at the intersections of their side faces with such truncation planes, the sides of the teeth being recessed to provide clearance spaces, and the boundaries of such clearance spaces being short of the cutting edges leaving lands immediately contiguous to the cutting edges.

2. A gear finishing tool constructed of material suitable for metal cutting tools and having teeth in circular arrangement around the axis of the tool, the side faces of which are conjugate to the teeth of the gears to be finished, said tool teeth being truncated on planes transverse to their length and inclined to their height dimensions, the intersections of which planes with the side faces form cutting edges, and the side faces of the teeth having clearance spaces and lands between such clearance spaces and said cutting edges.

3. A gear finishing tool of cylindrical gear character having teeth analogous to the teeth of cylindrical gears, which teeth are beveled on planes constituting segments of continuous conical helicoids surrounding the axis of the tool, all the intersections of which planes with the sides of the teeth forming cutting edges, and the sides of the teeth are recessed adjacent to the cutting edges but at distances sufficiently far therefrom to leave definite lands immediately adjacent to the cutting edges.

4. A gear finishing tool comprising a cylindrical body having teeth extending lengthwise of such body and of which the outlines in axial projection are similar to gear teeth; said teeth being made of material suitable for metal cutting tools and each being truncated between its ends on a plurality of transverse planes extending throughout substantially the full height of the tooth in directions so inclined to both the height and length dimensions of the tooth that the substance of each tooth is substantially longer at the root than at the crest of the tooth, said intersections giving some of the teeth a beveled formation with outwardly convergent end bounding faces, and forming notches between the ends of other teeth, all the intersections of said planes with the side faces of the several teeth being cutting edges, and substantially all of the teeth being of such height as to extend from the body across the pitch line on which the tool is designed to run with the gears which it is designed to finish.

5. A gear finishing tool as set forth in claim 4, in which the sides of the teeth between the truncation planes are recessed to provide clearance spaces, which spaces terminate short of the adjacent cutting edges and tooth crests, leaving lands immediately contiguous to such cutting edges and crests.

EDWARD W. MILLER.